(12) United States Patent
Jadhav et al.

(10) Patent No.: US 12,130,856 B2
(45) Date of Patent: Oct. 29, 2024

(54) METHOD AND SYSTEM TO CREATE AN ACCESSIBLE ENTERPRISE CONTENT BY DESIGN PRELIMINARY

(71) Applicant: Tata Consultancy Services Limited, Mumbai (IN)

(72) Inventors: Charudatta Jadhav, Mumbai (IN); Meghana Viyyapu, Hyderabad (IN); Manjiri Mohan Sathe, Pune (IN); Febin Bensam, Thiruvananthapuram (IN); Sai Chandana Sirisha Gorasa, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/117,525

(22) Filed: Mar. 6, 2023

(65) Prior Publication Data
US 2023/0289378 A1    Sep. 14, 2023

(30) Foreign Application Priority Data
Mar. 7, 2022    (IN)  .............................. 202221012357

(51) Int. Cl.
*G06F 16/383*   (2019.01)
*G06F 16/34*    (2019.01)
*G06F 40/103*   (2020.01)

(52) U.S. Cl.
CPC .......... *G06F 16/383* (2019.01); *G06F 16/345* (2019.01); *G06F 40/103* (2020.01)

(58) Field of Classification Search
CPC ..... G06F 16/383; G06F 16/345; G06F 40/103
See application file for complete search history.

(56) References Cited

U.S. PATENT DOCUMENTS

| | | | |
|---|---|---|---|
| 7,849,048 B2 | 12/2010 | Langseth et al. | |
| 8,200,700 B2 | 6/2012 | Moore et al. | |
| 10,191,974 B2 | 1/2019 | Indeck et al. | |
| 10,423,709 B1 | 9/2019 | Bradley et al. | |
| 11,003,796 B2 | 5/2021 | Tucker et al. | |
| 11,222,052 B2 | 1/2022 | Hertz et al. | |
| 2005/0028098 A1* | 2/2005 | Harrington | ........ H04N 1/00005 |
| | | | 715/244 |

(Continued)

*Primary Examiner* — Hosain T Alam
*Assistant Examiner* — Robert F May
(74) *Attorney, Agent, or Firm* — Finnegan, Henderson, Farabow, Garrett & Dunner, L.L.P.

(57) ABSTRACT

In today's world, knowledge dissemination through online versions of novels or textbooks i.e., in portable document format, in which the entire life cycle in content generation has a huge gap forcing organizations to spend lots of efforts to introduce accessibility. This disclosure relates a method and system to create accessible enterprise content by design. The method receives one or more content as an input from various sources. One or more features associated with each of one or more content is extracted. The content is validated to identify one or more content is accessible or inaccessible based on one or more features. Each inaccessible content is dynamically remediated based on accessibility attributes to obtain one or more accessible content. The one or more accessible content is converted into one or more desired accessible formats based on one or more classes and a logical reading order of one or more content.

12 Claims, 6 Drawing Sheets

(56) References Cited

U.S. PATENT DOCUMENTS

| | | | |
|---|---|---|---|
| 2005/0160065 A1* | 7/2005 | Seeman | G06F 16/957 |
| 2009/0132384 A1* | 5/2009 | Duncan | G06F 40/143 |
| | | | 707/999.102 |
| 2015/0279070 A1* | 10/2015 | Nandakumar | G06F 3/0481 |
| | | | 345/646 |
| 2016/0371233 A1* | 12/2016 | Seabright | G06F 3/1245 |
| 2017/0078364 A1* | 3/2017 | Jadhav | G06F 21/16 |
| 2019/0122579 A1* | 4/2019 | Blakey | G09B 21/005 |
| 2019/0205362 A1* | 7/2019 | Prebble | G06F 40/103 |
| 2020/0073921 A1* | 3/2020 | Bradley | G06F 40/103 |
| 2022/0382975 A1* | 12/2022 | Gu | G06F 40/216 |
| 2023/0269301 A1* | 8/2023 | Runzo | G06F 16/958 |
| | | | 705/1.1 |

* cited by examiner

METHOD AND SYSTEM TO CREATE AN ACCESSIBLE ENTERPRISE CONTENT BY DESIGN PRELIMINARY

PRIORITY CLAIM

This U.S. patent application claims priority under 35 U.S.C. § 119 to: India Application No. 202221012357, filed on Mar. 7, 2022. The entire contents of the aforementioned application are incorporated herein by reference.

TECHNICAL FIELD

This disclosure relates generally to the field of content/data management, and, more particularly, to a method and system to create an accessible enterprise content by design.

BACKGROUND

In today's world, knowledge dissemination through online versions of portable document format (PDF) novels or textbooks, and most documents like pay-slips, financial transaction statements are common. However, there are content which may not be accessible causing hardships to different types of users as the inaccessible documents do not have proper logical structure, due to which they cannot be read by assistive technologies. For example, it is not easy for a person with print disability as most of the contents are not available in an accessible format. This is a discriminatory situation and impacts every aspect of life i.e., education, employment, and even social standing for the print disabled individual. Apart from books, thousands of documents related to banking, insurance, corporate, and many more business to customer (B2C) industries are getting created every day, but most of them are in-accessible by default which deprived an equal access to the print disabled individual.

In the current scenario, the documents are getting produced in three major ways: (a) via a text editor containing proprietary formats such as a portable document format (PDF), Microsoft word, Power point presentation (PPT), rich text format (RTF), etc; (b) a raw content coming from a database mostly in an extensible markup language (XML) format for transactional documents such as monthly statements, salary slips; and (c) content from Content Management System (CMS). EPUB®3, a Digital Accessible Information System (DAISY), a Daisy audio, a Braille, and an accessible PDF are accessible formats. In all these scenarios, mostly a reactive approach i.e., implementing accessibility after content/document production is followed to make existing documents accessible which involves identification of noncompliance of document accessibility standards (PDF, EPUB® 3, and Web content accessibility guidelines (WCAG)) and then remediating it. The content life cycle with existing approaches did not reach the stage where complete accessibility implementation (i.e., full automation). Identifying accessibility issues still has some automation, but remediation is mostly human driven. Reactive accessibility remediation is not a right and practical approach because thousands of documents are getting created every day are not only manual, but there are automated systems through which documents are generated. For example, bank statements, salary slips, insurance papers etc. are some examples where content comes from the database or the CMS, but the output document is inaccessible and based on requirement it's been remediated for accessibility in reactive manner or manually.

Implementing accessibility as an afterthought and manually, is a laborious process as they are not always intuitive to use and require specialized training and requires niche skill which is scarce in industry. Manual assessment and the remediation using assistive technologies like screen reader for documents each page contribute to higher costs and efforts. There is no provision on accessibility implementation at raw data and layout level for content management system. Low accuracy exists for language remediation when a document is of a different language. When a document has inaccessible mathematical content and complex images, it will be challenging for persons with disabilities to perceive content. Automatically added Alt text, title, and labels to form fields may or may not be accurate or meaningful. Users must remediate headings and paragraphs manually which is time consuming, and there is no remediation for elements like page labels and abbreviations. Therefore, the process of detection of the headings is not automatic, and complex. For example, a parent child hierarchy cannot be established automatically. Further, there is no provision to identify abbreviations, and conduct page labels remediation. Therefore, adapting accessibility through entire life cycle from the content generation to content processing and finally to document creation/content publishing is a huge gap and hence organizations spend lots of efforts to introduce accessibility after the document has been created by legacy systems. There are several technical problems to be solved at content level as well as enterprise process level.

SUMMARY

Embodiments of the present disclosure present technological improvements as solutions to one or more of the above-mentioned technical problems recognized by the inventors in conventional systems. For example, in one embodiment, a processor implemented method of creating an accessible enterprise content by design is provided. The processor implemented method includes at least one of: receiving, via an input/output interface, one or more content from one or more sources as an input; extracting, via one or more hardware processors, one or more features associated with each of the one or more content; validating, via the one or more hardware processors, the one or more content by performing a check to identify whether the one or more content is accessible or inaccessible based on the extracted one or more features; dynamically remediating, via the one or more hardware processors, one or more inaccessible content based on one or more accessibility attributes to obtain one or more accessible content; and converting, via the one or more hardware processors, the one or more accessible content into one or more desired accessible formats based on one or more class associated with the one or more content and a logical reading order of the one or more content. The one or more features correspond to one or more appearance attributes. The one or more appearance attributes are categorized based on one or more class associated with the one or more content. The logical reading order is a distinctive order which is assigned to each element of one or more content.

In an embodiment, the one or more content includes: (i) a textual and non-textual elements and corresponding attributes, and properties extracted from a structured format, or (ii) an unstructured format, and (iii) combination thereof. In an embodiment, the one or more content from the one or more sources corresponds to: (i) a ready unstructured document, or (ii) a raw content obtained from a structured database or an unstructured database, or (iii) a raw content and a design layout obtained from a content management system (CMS), and a combination thereof. In an embodiment, at least one class from the one or more classes corresponds to at least one: (i) textual class, or (ii) non-textual class, and (iii) a combination thereof. In an embodiment, the one or more appearance attributes corresponds to: (i) font properties associated with the one or more content, (ii) position values, (iii) text parameters, (iv) margin values, (v) scale attributes, (vi) border attributes, and (vii) background color. In an embodiment, the one or more accessibility attributes corresponds to: (i) an expansion text for a first occurrence of one or more abbreviations, (ii) at least one meaningful summary for images associated with graphs and charts, (iii) one or more mathematical expressions identified in LaTex format are converted into a mathematical markup language (MathML) format, (iv) language for one or more paragraphs, (v) replacement text for one or more links, and (vi) column span and row span attributes to complex table data.

In another aspect, there is provided a system for creating accessible enterprise content by design. The system includes a memory storing instructions; one or more communication interfaces; and one or more hardware processors coupled to the memory via the one or more communication interfaces, wherein the one or more hardware processors are configured by the instructions to: receive, one or more content from one or more sources as an input; extract, one or more features associated with each of the one or more content; validate, the one or more content by performing a check to identify whether the one or more content is accessible or inaccessible based on the extracted one or more features; dynamically remediate, one or more inaccessible content based on one or more accessibility attributes to obtain one or more accessible content; and convert, the one or more accessible content into one or more desired accessible formats based on one or more class associated with the one or more content and a logical reading order of the one or more content. The one or more features correspond to one or more appearance attributes. The one or more appearance attributes are categorized based on one or more class associated with the one or more content. The logical reading order is a distinctive order which is assigned to each element of one or more content.

In an embodiment, the one or more content includes: (i) a textual and non-textual elements and corresponding attributes, and properties extracted from a structured format, or (ii) an unstructured format, and (iii) combination thereof. In an embodiment, the one or more content from the one or more sources corresponds to: (i) a ready unstructured document, or (ii) a raw content obtained from a structured database or an unstructured database, or (iii) a raw content and a design layout obtained from a content management system (CMS), and a combination thereof. In an embodiment, at least one class from the one or more classes corresponds to at least one: (i) textual class, or (ii) non-textual class, and (iii) a combination thereof. In an embodiment, the one or more appearance attributes corresponds to: (i) font properties associated with the one or more content, (ii) position values, (iii) text parameters, (iv) margin values, (v) scale attributes, (vi) border attributes, and (vii) background color. In an embodiment, the one or more accessibility attributes corresponds to: (i) an expansion text for a first occurrence of one or more abbreviations, (ii) at least one meaningful summary for images associated with graphs and charts, (iii) one or more mathematical expressions identified in LaTeX format are converted into a mathematical markup language (MathML) format, (iv) language for one or more paragraphs, (v) replacement text for one or more links, and (vi) column span and row span attributes to complex table data.

In yet another aspect, there are provided one or more non-transitory machine readable information storage mediums comprising one or more instructions which when executed by one or more hardware processors causes at least one of: receiving, one or more content from one or more sources as an input; extracting, one or more features associated with each of the one or more content; validating, the one or more content by performing a check to identify whether the one or more content is accessible or inaccessible based on the extracted one or more features; dynamically remediating, one or more inaccessible content based on one or more accessibility attributes to obtain one or more accessible content; and converting, the one or more accessible content into one or more desired accessible formats based on one or more class associated with the one or more content and a logical reading order of the one or more content. The one or more features correspond to one or more appearance attributes. The one or more appearance attributes are categorized based on one or more class associated with the one or more content. The logical reading order is a distinctive order which is assigned to each element of one or more content.

In an embodiment, the one or more content includes: (i) a textual and non-textual elements and corresponding attributes, and properties extracted from a structured format, or (ii) an unstructured format, and (iii) combination thereof. In an embodiment, the one or more content from the one or more sources corresponds to: (i) a ready unstructured document, or (ii) a raw content obtained from a structured database or an unstructured database, or (iii) a raw content and a design layout obtained from a content management system (CMS), and a combination thereof. In an embodiment, at least one class from the one or more classes corresponds to at least one: (i) textual class, or (ii) non-textual class, and (iii) a combination thereof. In an embodiment, the one or more appearance attributes corresponds to: (i) font properties associated with the one or more content, (ii) position values, (iii) text parameters, (iv) margin values, (v) scale attributes, (vi) border attributes, and (vii) background color. In an embodiment, the one or more accessibility attributes corresponds to: (i) an expansion text for a first occurrence of one or more abbreviations, (ii) at least one meaningful summary for images associated with graphs and charts, (iii) one or more mathematical expressions identified in LaTeX format are converted into a mathematical markup language (MathML) format, (iv) language for one or more paragraphs, (v) replacement text for one or more links, and (vi) column span and row span attributes to complex table data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for an approach to address content accessibility problems for an enterprise level holistically. The present disclosure provides a method and system to create an accessible enterprise content by design. The present disclosure provides a machine-driven approach i.e., a content accessibility platform to create accessible enterprise content while addressing complexity of different types of content, even at their origin. The content accessibility platform can process input content which is in: (i) a structured format, or (ii) an unstructured format, and (iii) combination thereof. The input content (i) extracted textual and non-textual content from a ready unstructured document, or (ii) a raw content obtained from a structured database or an unstructured database, or (iii) a raw content and a design layout (e.g., title/logo) obtained from a content management system (CMS) and combination thereof. One or more features associated with each of the one or more content is extracted. The one or more features correspond to one or more appearance attributes. The one or more content is validated by performing a check to identify whether the one or more content is accessible or inaccessible based on the extracted one or more features. One or more inaccessible content is dynamically remediated based on one or more accessibility attributes to obtain one or more accessible content. The one or more appearance attributes are categorized based on one or more class associated with the one or more content. The one or more desired accessible formats of the one or more accessible data is obtained based on one or more class associated with the one or more content and a logical reading order of the one or more content. The logical reading order is a distinctive order which is assigned to each element of one or more content.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
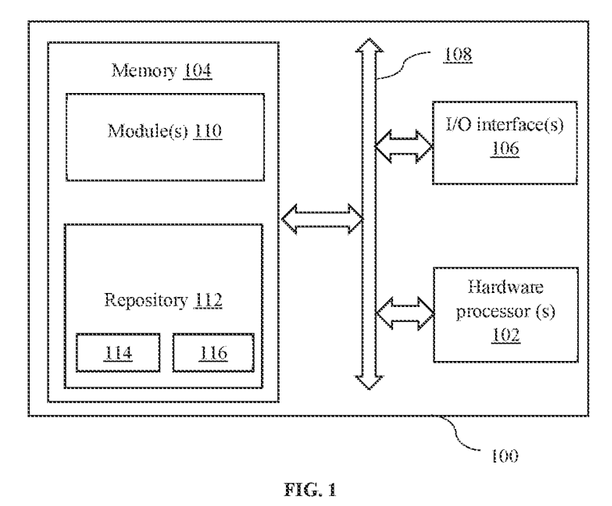
FIG. 1 illustrates a block diagram of a system to create an accessible enterprise content by design, according to some embodiments of the present disclosure.

FIG. 1 illustrates a block diagram of system 100 to create an accessible enterprise content by design, according to some embodiments of the present disclosure. In an embodiment, the system 100 includes one or more processor(s) 102, communication interface device(s) or input/output (I/O) interface(s) 106, and one or more data storage devices or memory 104 operatively coupled to the one or more processor (s) 102. The memory 104 includes a database. The one or more processor(s) 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 are configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting a number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2:
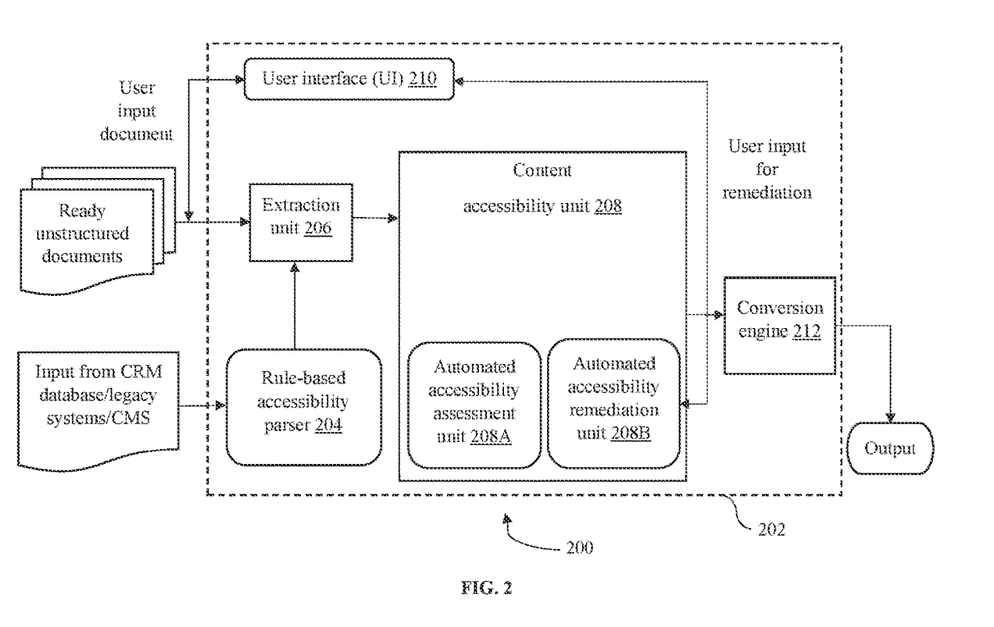
FIG. 2 illustrates an exemplary functional block diagram of a content accessibility platform of the system of FIG. 1, according to some embodiments of the present disclosure.
Figure 3A:
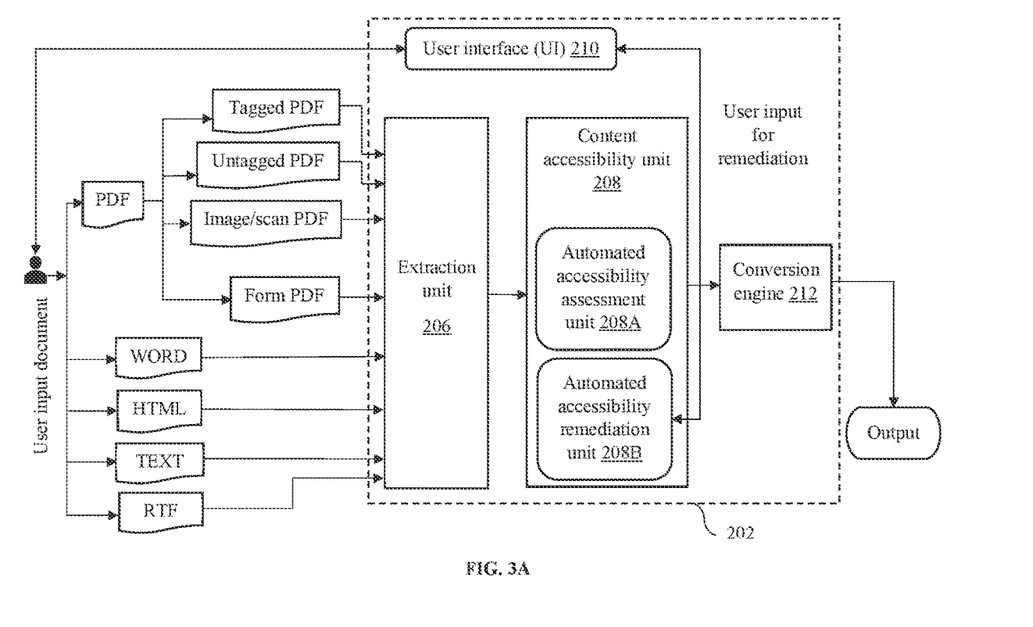
FIG. 3A illustrates an exemplary functional block diagram of the content accessibility platform receiving one or more ready unstructured documents as an input, according to some embodiments of the present disclosure.

FIG. 2 illustrates an exemplary functional block diagram of a content accessibility platform 202 of the system 100 of FIG. 1, according to some embodiments of the present disclosure. FIG. 3A is an exemplary functional block diagram illustrating one or more ready unstructured documents are received as an input at the content accessibility platform 202, according to some embodiments of the present disclosure. A system 200 may be an example of the system 100 (FIG. 1). The system 200 includes the content accessibility platform 202. The content accessibility platform 202 further includes a rule-based accessibility parser 204, an extraction unit 206, a content accessibility unit 208, a user interface (UI) 210, and a conversion engine 212. The content accessibility platform 202 is configured to receive one or more content from one or more sources as an input. The one or more content from the one or more sources includes: (i) a structured format, or (ii) an unstructured format, and (iii) combination thereof. The one or more content corresponds to a ready unstructured document (e.g., portable document format (PDF)). In an embodiment, multiple formats of the document with unstructured data are taken as the input from the user interface (UI) 210. For example, the type of the document corresponds to the PDF (e.g., tagged, untagged, image or form), a HyperText Markup Language (HTML), a Text, a rich text format (RTF), or a Microsoft® word. In an embodiment, the PDF corresponds to a tagged PDF, an untagged PDF, a form PDF, an image PDF.

The extraction unit 206 is configured to extract one or more features associated with one or more content. The one or more features correspond to one or more appearance attributes. The one or more appearance attributes are categorized based on one or more class associated with the one or more content. In an embodiment, at least one class from the one or more classes corresponds to at least one: (i) textual class, or (ii) non-textual class, and (iii) a combination thereof. The one or more appearance attributes includes but not limited to font properties (e.g., font type, color, size), associated with the one or more content, position values (e.g., text matrix values for text content), text parameters (e.g., page numbers, and bounding box values for text), margin values, scale attributes (e.g., width and height for images), border attributes, visual appearance attributes (e.g., border color, background color, width, and height), field attributes (e.g., a field type, a field name, a field flag, and a field label) for forms. In an exemplary embodiment, regular expression patterns and different text parameters i.e., text properties, the position values were used to detect ordered and unordered list items, group them into lists, and differentiate them into multiple lists. Based on the identified list items, accessibility attributes (e.g., list, list item, and list body) are set to the identified content as part of remediation process.

The one or more classes corresponds to one or more categories of element. The one or more categories of element corresponds to: (i) a textual e.g., link, list, abbreviations, headings, paragraphs, header, and footer, and (ii) a non-textual e.g., table, forms, images, drawings or graphic. For example, after identifying images, the images are trained on an information model with VGG architecture for 30 epochs with data augmentation to recognize charts and graphs i.e., extracting chart elements (refer to technique mentioned in Indian patent application 202321003164 dated on 16 Jan. 2023). Similarly, a BERT text detector is configured to extract text from the images.

In an exemplary embodiment, the headings define the structure of the document and present organization of content. For example, one or more layers of filters i.e., text properties, spans of text, were used to identify, and differentiate text into different heading levels and group different spans of text/lines of text into paragraphs. The text of identified paragraphs is processed to identify the language of paragraphs (e.g., Chinese, Spanish, German, and English) using but not limited to the natural language toolkit and patterns. The language accessibility attribute is set to paragraphs as part of remediation. Accessibility assessment for headings is performed at a document level. During assessment, a check is performed to identify if one or more headings were present in proper hierarchy or not, and if there is any skip in heading levels (e.g., H2 to H4) which is non-compliance, the heading levels were modified in the remediation step.

In an exemplary embodiment, one or more tables are identified from the raw content based on the one or more parameters i.e., lattice parameter that identifies tables with lines between cells, and stream parameter that identifies tables without cells between them. The different rows and the cells in the table rows were processed to identify data in cells, depending on the position of the data in cell, the data is assigned with accessibility attributes i.e., table row, table header and table data, and when there are cells spanning multiple rows and columns, ColumnSpan and RowSpan accessibility attributes were set through as part of the remediation step. In an embodiment, a marked content identifier (MCID) value is created after recognizing text associated with the table data in the content stream and establishing a relationship between tagged structure of tables and the data in the content stream.

In an exemplary embodiment, a document includes multiple occurrences of the same abbreviation. Detection of a first occurrence of abbreviations in the content and identifying the presence and position in one or more textual elements i.e., headings, paragraphs and lists is performed based on processing spans of text and checking for different patterns in the processed spans of text. For example, if abbreviations without expansion text are detected during the assessment, then expansion text (i.e., the accessibility attribute) is added to abbreviations present in the spans of text as part of the remediation step.

In an exemplary embodiment, a single or multiple links are detected from different spans of text a in line, identifying the position of link from the spans of text, associating the identified link from content with a parent element (e.g., headings, paragraphs, lists) is performed after processing the spans of text and the text position values. Subsequently, replacement text i.e., the accessibility attribute) is assigned to links as part of the remediation step. In an embodiment, extract text position, spans of text, and detect repetition of text across different pages for identifying headers and footers. After identifying headers and footers, accessibility attributes (e.g., Artifact) are added to headers and footers for remediation.

The extraction unit 206 assigns a logical reading order to one or more required elements using which one or more tags are created in same hierarchy and dumps the information in a JSON file. In an embodiment, the one or more tags which corresponds to one or more containers that store all the meta data for the objects inside the PDF. For example, the one or more tags are specific to a PDF or a HTML document which indicates an element category. In an embodiment, properties associated with one or more elements i.e., position, text coordinates (e.g., x and y), were used to sort elements, detect elements in different columns and assign the logical reading order to each identified element on a page. The accuracy of assigning reading order is improved by updating the reading order of elements is performed as part of the remediation step. In an embodiment, the one or more ready unstructured content is passed as an input to the extraction unit 206 for extracting one or more features from the unstructured content and provide a JSON file with structured attributes that are further passed to the content accessibility unit 208 for access and fix accessibility issues.

The content accessibility unit 208 further includes an automated accessibility assessment unit 208A, and an automated accessibility remediation unit 208B. The content accessibility unit 208 is an artificial intelligence (AI) based automated accessibility intervention engine. The automated accessibility assessment unit 208A is configured to validate the one or more content by performing a check to identify whether the one or more content is accessible or inaccessible based on the extracted one or more features. In an embodiment, status of the one or more content corresponds to but not limited to (a) a compliant, and (b) a non-compliant. In an embodiment, status of the one or more content are identified based on one or more guidelines provided by web content accessibility guidelines (WCAG). In an embodiment, applicability of accessibility guidelines is checked for the elements are assessed for non-compliance as per accessibility digital publishing standards.

The automated accessibility remediation unit 208B is configured to dynamically remediate one or more inaccessible content based on one or more accessibility attributes to obtain one or more accessible content. The one or more accessibility attributes corresponds but not limited to: (i) an expansion text for a first occurrence of one or more abbreviations, (ii) at least one meaningful summary for images associated with graphs and charts, (iii) one or more mathematical expressions identified in LaTex format are converted into a mathematical markup language (MathML) format, (iv) language for one or more paragraphs, (v) replacement text for one or more links, and (vi) column span and row span attributes to complex table data. In an embodiment, the mathematical expressions, and the equations from the incoming content are extracted and identified whether they are in the LaTeX format or in the MathML format, to use scientific and mathematical content by presenting as one or more mathematical objects. For example, if the expression is in the MathML format, then the same MathML code is utilized for generating a meaningful description. Alternatively, the MathML code is generated for LaTeX formatted expressions/equations. For example, an expression $Ax2+Bx+C-y$ is defined in LaTeX and MathML formats are as shown below:

Latex: {\displaystyle Ax^{2}+Bx+C-y} content.js
Mathml: <math><mstyle scriptlevel="0"
displaystyle="true"><mi>A</mi>content.js
<msup><mi>x</mi><mn>2</mn></msup><mo>+</mo><mi>B</mi><mi>x</mi><mo>></mo><mi>C</m
<mo>></mo><mi>y</mi></mstlye></math>
50 content.js In an embodiment, in case of simple images, a meaningful alternate text is added and in case of complex images, generated summary is generated as description as part of remediation along with alternate text since simple alternate text may not be sufficient to convey information. Therefore, created images are thereby accessible. For example, to remediate images with charts and graphs at runtime (refer to technique mentioned in Indian patent application 202221056011 dated on 29 Sep. 2022), summary of charts with retrieval of data are generated from database schema created runtime while extracting information from chart using combination of natural language processing, fine-grained perception, and analytical reasoning techniques. In an embodiment, the automated accessibility remediation unit 208B produces a JSON file containing the one or more accessible data e.g., the accessible enterprise content as an output. The automated accessibility remediation unit 208B adds one or more necessary tags that are required to allow the content to be accessible. In an embodiment, a new Xref value is generated for each image present in the PDF, updating the object structure of the image with the one or more tags required for accessibility purpose (e.g., Figure, Alt) and linking the object structure generated with the image data in the stream using the MCID value generated for image in the stream.

In an embodiment, the noncompliance is fixed using one or more techniques but are not limited to natural language processing (NLP), machine learning, deep learning algorithms, artificial intelligence based decisioning to achieve maximum coverage. The user interface (UI) 210 takes necessary inputs from a user to remediate elements or validate fixes that cannot be remediated automatically. For example, providing a document title, a meaningful alternate text to an image, one or more labels to form fields, a metadata information, a page label information etc. Depending on the type of page numbers e.g., lowercase roman numerals, uppercase roman numerals, uppercase alphabets, lowercase alphabets and Arabic numerals used in the document, the page label categories are assigned to page numbers as part of the remediation step. In an alternative embodiment, where user can modify one or more accessibility attributes i.e., changing heading to paragraph and vice versa, table header to table data, changing reading order.

The conversion engine 212 is configured to convert the one or more accessible content (e.g., JSON file) into one or more desired accessible formats based on one or more class associated with the one or more content and a logical reading order of the one or more content. The logical reading order is a distinctive order which is assigned to each element of one or more content. In an embodiment, the logical reading order is the order in which one or more screen readers perceive one or more content. In an embodiment, the one or more accessible data are converted into one or more accessible formats i.e., one or more accessibility at document, page, and element level. The conversion engine 212 internally extracts one or more attributes to publish in desired accessible formats (refer to technique mentioned in Indian patent application 3541/MUM/2015 dated on 15 Sep. 2015). For example, the conversion engine 212 scans the content of the document, inserts one or more accessible elements such as heading, paragraph tags, other accessibility requirements to into an electronic accessible format. The conversion engine 212 is invoked for intermediate document creation to assist one or more users in remediation and confirmation and for accessible enterprise content creation in one or more formats. The accessible enterprise content can be but not limited to a tagged PDF, an EPUB®3, a digital accessible information system (DAISY) text, a digital accessible information system (DAISY) audio, and a Braille (e.g., soft format *.brf).

Figure 3B:
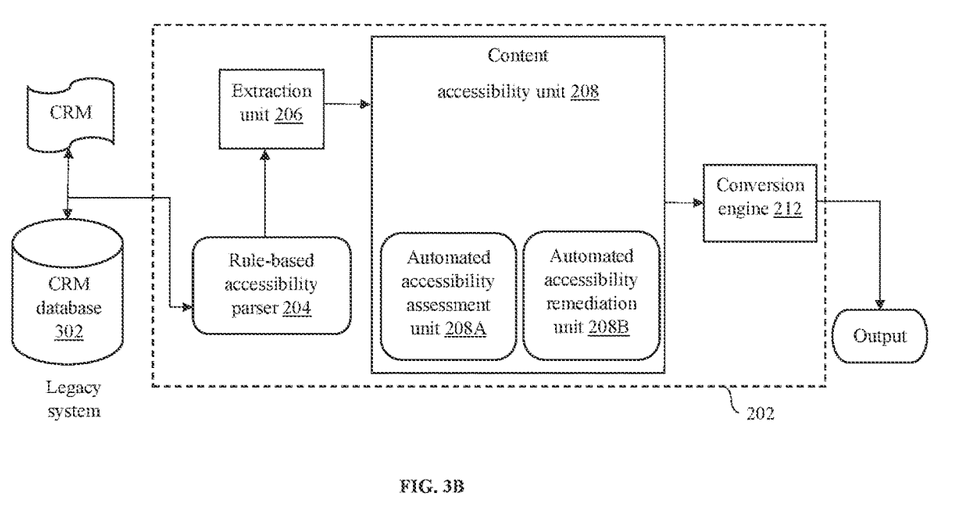
FIG. 3B illustrates an exemplary functional block diagram of the content accessibility platform receiving data from a legacy system as an input, according to some embodiments of the present disclosure.
Figure 3C:
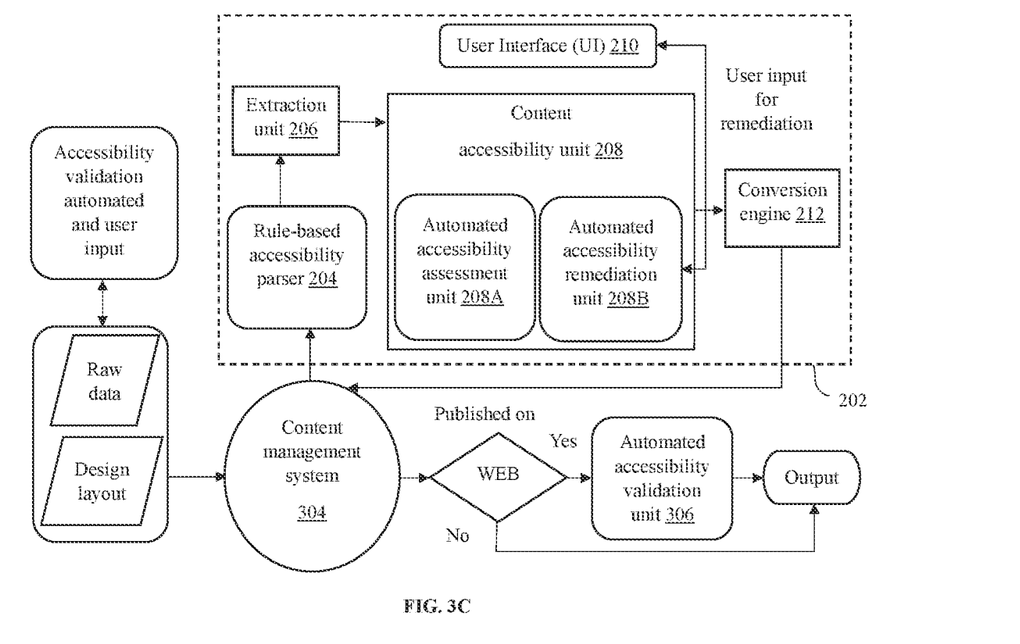
FIG. 3C illustrates an exemplary functional block diagram of the content accessibility platform receiving data from a content management system (CMS) as an input, according to some embodiments of the present disclosure.

FIG. 3B is an exemplary functional block diagram illustrating data from a legacy system received as an input at the content accessibility platform 202, according to some embodiments of the present disclosure. The one or more content from the one or more sources are also corresponds to: (a) a raw content received from a structured database or an unstructured database i.e., from the legacy system e.g., a customer relationship management (CRM) with corresponding database 302 (as depicted in FIG. 3B), or (b) a raw content and a design layout (e.g., title/logo) obtained from a content management system (CMS) 304 (as depicted in FIG. 3C), and combination thereof. The raw content from the CRM database with corresponding database 302 is in an extensible markup language (XML) format. For example, the raw content may be one or more transactional documents but not limited to monthly statements, salary slips for one or more enterprises. The rule-based accessibility parser 204 is configured to receive one or more data from the CRM with the corresponding database 302 as an input to produce data with one or more attributes. The XML file generated from the CRM database 302 or raw data from the legacy system are passed through the rule-based accessibility parser 204 e.g., an artificial intelligence (AI) based XML parser. In an embodiment, the data with one or more attributes is in the XML format. The processed data is passed on to the extraction unit 206 to extract the one or more features depending on one or more formats associated with the input data as received.

The automated accessibility assessment unit 208A is configured to validate the one or more content by performing a check to identify whether the one or more content is accessible or inaccessible based on the extracted one or more features. In an embodiment, status of the one or more content corresponds to but not limited to (a) a compliant, and (b) a non-compliant. The automated accessibility remediation unit 208B is configured to dynamically remediate one or more inaccessible content based on one or more accessibility attributes to obtain one or more accessible content. In an embodiment, the automated accessibility remediation unit 208B produces a JSON file containing the one or more accessible data e.g., the accessible enterprise content as an output. The conversion engine 212 is configured to convert the one or more accessible data (e.g., JSON file) into one or more desired accessible formats based on the one or more classes associated with the one or more content and a logical reading order of the one or more content. In an embodiment, the one or more accessible data are converted into one or more accessible formats i.e., one or more accessibility at document, page, and element level. The conversion engine 212 internally extracts one or more attributes to publish in desired accessible formats.

FIG. 3C is an exemplary functional block diagram illustrating data from the content management system (CMS) 304 received as an input at the content accessibility platform 202, according to some embodiments of the present disclosure. The rule-based accessibility parser 204 is configured to receive the raw content and the design layout obtained from the content management system (CMS) 304. In an embodiment, the CMS 304 facilitates content creation, retention, and distribution to streamline business processes. The accessibility intervention is added at an entry level were accessibility inputs i.e., form-labels, expansion text, meaningful summary, replacement text i.e., properties related to respective textual and non-textual elements, and other document and element level inputs for raw data and design layout (e.g., title/logo) are considered. The design layout is also assessed through the automated accessibility assessment unit 208A and the automated accessibility remediation unit 208B. The accessible attributed CMS data and the design layout is passed to the CMS 304 for further changes and review of a draft. The draft is passed through the rule-based accessibility parser 204 for structuring attributes and further passed to the extraction unit 206. The accessible file is received as an output from the conversion engine 212 i.e., in a desired format are sent back to the CMS 304 and a validation is performed by an automated accessibility validation unit 306 before publishing the accessible content. In an embodiment, the content being published on a Web, another level of accessibility intervention is added to make sure the content on the web is accessible based on WCAG2.1 guideline. In another embodiment, for any other publishing platform or document in the accessible format output from the conversion engine 212 is disseminated from the CMS 304.

Figure 4:
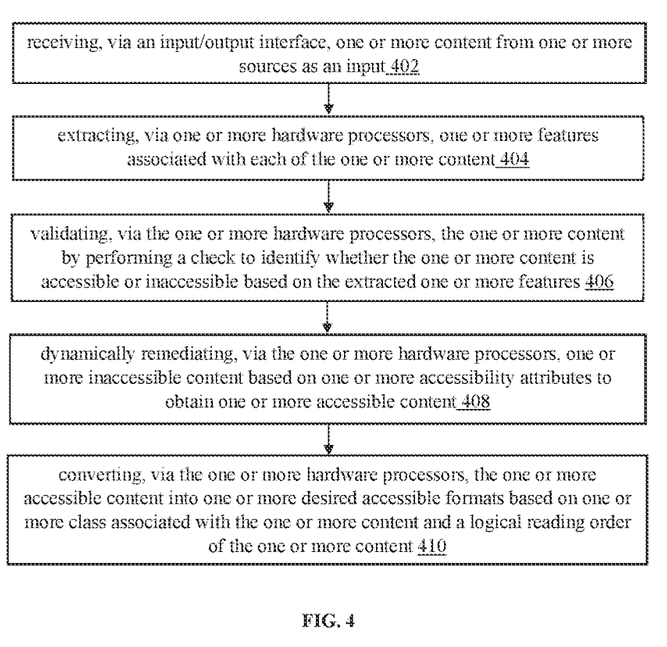
FIG. 4 is a flow diagram illustrating a method of creating accessible enterprise content, according to some embodiments of the present disclosure.

FIG. 4 is a flow diagram illustrating a method of creating accessible enterprise content, according to some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1 and 2.

At step 402, one or more content is received as an input from one or more sources. In an embodiment, the one or more content includes: (i) a textual and non-textual elements and corresponding attributes, and properties extracted from a structured format, or (ii) an unstructured format, and (iii) combination thereof. In an embodiment, the one or more content from the one or more sources corresponds to: (i) a ready unstructured document, or (ii) a raw content obtained from a structured database or an unstructured database, or (iii) a raw content and a design layout obtained from a content management system (CMS), and a combination thereof. At step 404, one or more features associated with the one or more content are extracted. The one or more features correspond to one or more appearance attributes. The one or more appearance attributes are categorized based on one or more class associated with the one or more content. In an embodiment, the one or more appearance attributes corresponds to: (i) font properties associated with the one or more content, (ii) position values, (iii) text parameters, (iv) margin values, (v) scale attributes, (vi) border attributes, and (vii) background color. At step 406, the one or more content is validated by performing a check to identify whether the one or more content is accessible or inaccessible based on the extracted one or more features.

At step 408, one or more inaccessible content is dynamically remediated based on one or more accessibility attributes to obtain one or more accessible content. In an embodiment, the one or more accessibility attributes corresponds to: (i) an expansion text for a first occurrence of one or more abbreviations, (ii) at least one meaningful summary for images associated with graphs and charts, (iii) one or more mathematical expressions identified in LaTeX format are converted into a mathematical markup language (MathML) format, (iv) language for one or more paragraphs, (v) replacement text for one or more links, and (vi) column span and row span attributes to complex table data. At step 410, the one or more accessible content is converted into one or more desired accessible formats based on one or more class associated with the one or more content and a logical reading order of the one or more content. The logical reading order is a distinctive order which is assigned to each element of one or more content. In an embodiment, at least one class from the one or more classes corresponds to at least one: (i) textual class, or (ii) non-textual class, and (iii) a combination thereof.

The embodiment of the present disclosure herein addresses unresolved problems of content or document accessibility at an enterprise level. The embodiment thus provides a content accessibility platform to create an accessible enterprise content by design. The embodiment of the present disclosure introduces accessibility irrespective of the document format. The present disclosure can consider diverse inputs that could be ready documents to raw content from legacy system or CMS, extract textual, non-textual elements, and corresponding attributes, properties, and features to integrate accessibility and later assess and fix the accessibility issues and generate the accessible contents as per the requirement of an enterprise. The present disclosure provides a holistic approach of solving all types of content accessibility in one platform and solves the problem at root level overcoming flaws associated with a reactive approach.

The present disclosure can develop an AI based approach for processing raw and unstructured content derived from traditional document formats. Further, elevate the AI based technology to envisage enterprise system to take care end to end process from content generation to content production with a machine-driven approach. Introducing accessibility touch points across diverse processes of content creation with AI driven automation across value chain of digital publishing. The content accessibility platform transforms a current digital publishing landscape with corresponding hybrid approach to address accessibility at root level. The content accessibility platform can take documents of different formats, understand the context and structure of the content with AI driven automation capabilities. The content accessibility platform with machine first approach to introduce accessibility in content creation lifecycle, minimize the human intervention, and embed accessibility in DNA of content creation process and achieve inclusive content in real sense. The content accessibility platform can be used as standalone, cloud base, integrated with the legacy system, and create seamless process for end-to-end accessibility implementation of document at all relevant stages.

A standard specification and guidelines are in direct relationship with one or more elements. The present disclosure can identify one or more elements and apply guidelines to assess compliance at element level. The present disclosure address one or more accessibility issues for documents: (i) detection of language of documents of any language after processing the text of document using a natural language processing (NLP), (ii) addition of alternate text (e.g., table markups, list elements, forms elements etc.) using an artificial intelligence (AI) based decisioning approach to improve an accuracy of alternate text being added, (iii) automated process of linking form fields to widget annotations along with the artificial intelligence (AI) based decisioning approach of adding labels to form fields to improve accessibility, (iv) recognition of structure of table elements like table headers, rows, columns using a machine learning algorithm after collecting data (e.g., different types of tables in PDFs), (v) page labels tagging is performed using the artificial intelligence (AI) based decisioning approach to improve accuracy of the type of page label (e.g., a roman, a decimal) being added to the document, (vi) identification and fixing of headings and paragraphs using a method to extract text associated, (vii) identifying link text in a content stream and generating the marked content identifier (MCID) and establishing a relationship between link tag structure and a link content in the content stream, and (viii) hybrid approach for abbreviations, automation is used for standard notations and the artificial intelligence (AI) based decisioning approach for non-standard abbreviations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via an input/output interface, content from one or more sources as an input, wherein the content from the one or more sources corresponds to:
(i) a ready unstructured document,
(ii) a raw content obtained from a structured database or an unstructured database, and
(iii) a raw content and a design layout obtained from a content management system (CMS) and a combination thereof;
extracting, via one or more hardware processors, one or more features associated with the content, wherein the one or more features correspond to one or more appearance attributes, and wherein the one or more appearance attributes are categorized based on one or more classes associated with the content, wherein the one or more appearance attributes corresponds to at least one of: (i) font properties associated with the one or more content, (ii) position values, (iii) text parameters, (iv) margin values, (v) scale attributes, (vi) border attributes, or (vii) background color, wherein the one or more classes corresponds to one or more categories of element, and the one or more categories of element corresponds to: (i) a textual data that includes a link, a list, abbreviations, headings, paragraphs, a header, and a footer, and (ii) a non-textual data that includes table, forms, images, drawings, and graphic, wherein the images are trained on an information model with Visual Geometry Group (VGG) architecture for 30 epochs with data augmentation to recognize charts and graphs;
assigning a logical reading order to the one or more categories of element using one or more tags that are created in a same hierarchy and dumps the information in a JavaScript Object Notation (JSON) file, wherein an accuracy of assigning the logical reading order is improved by updating the logical reading order of one or more categories of elements;
validating, via the one or more hardware processors, the content by performing a check to identify whether the content is one of accessible content or inaccessible content based on the extracted one or more features, wherein the content is validated using an artificial intelligence (AI) based automated accessibility intervention engine;
dynamically remediating, via the one or more hardware processors, inaccessible content based on one or more accessibility attributes to obtain the accessible content; and
converting, via the one or more hardware processors, the accessible content into accessible formats based the on one or more classes associated with the content and a logical reading order of the content, wherein the logical reading order which is assigned to each element of the content.

2. The processor implemented method as claimed in claim 1, wherein the one or more content comprises at least one of: (i) a textual and non-textual elements and corresponding attributes, and properties extracted from a structured format, (ii) an unstructured format, or (iii) combination thereof.

3. The processor implemented method as claimed in claim 1, wherein at least one class from the one or more classes corresponds to at least one of: (i) textual class, (ii) non-textual class, or (iii) a combination thereof.

4. The processor implemented method as claimed in claim 1, wherein the one or more accessibility attributes corresponds to at least one of: (i) an expansion text for a first occurrence of one or more abbreviations, (ii) at least one meaningful summary for images associated with graphs and charts, (iii) one or more mathematical expressions identified in LaTeX format are converted into a mathematical markup language (MathML) format, (iv) language for one or more paragraphs, (v) replacement text for one or more links, or (vi) column span and row span attributes to complex table data.

5. A system, comprising:
a memory storing instructions;
one or more communication interfaces; and
one or more hardware processors coupled to the memory via the one or more communication interfaces, wherein the one or more hardware processors are configured by the instructions to:
receive content from one or more sources as an input, wherein the content from the one or more sources corresponds to at least one of:
(i) a ready unstructured document,
(ii) a raw content obtained from a structured database or an unstructured database, or
(iii) a raw content and a design layout obtained from a content management system (CMS) and a combination thereof;
extract, one or more features associated with of the content, wherein the one or more features correspond to one or more appearance attributes, and wherein the one or more appearance attributes are categorized based on one or more classes associated with the content, wherein the one or more appearance attributes corresponds to at least one of: (i) font properties associated with the one or more content, (ii) position values, (iii) text parameters, (iv) margin values, (v) scale attributes, (vi) border attributes, or (vii) background color, wherein the one or more classes corresponds to one or more categories of element, and the one or more categories of element corresponds to: (i) a textual data that includes a link, a list, abbreviations, headings, paragraphs, a header, and a footer, and (ii) a non-textual data that includes table, forms, images, drawings, and graphic, wherein the images are trained on an information model with Visual Geometry Group (VGG)

architecture for 30 epochs with data augmentation to recognize charts and graphs;

assign a logical reading order to the one or more categories of element using one or more tags that are created in a same hierarchy and dumps the information in a JavaScript Object Notation (JSON) file, wherein an accuracy of assigning the logical reading order is improved by updating the logical reading order of one or more categories of elements;

validate, the content by performing a check to identify whether the content is one of accessible content or inaccessible content based on the extracted one or more features, wherein the content is validated using an artificial intelligence (AI) based automated accessibility intervention engine;

dynamically remediate, inaccessible content based on one or more accessibility attributes to obtain the accessible content; and convert, the accessible content into accessible formats based on one or more classes associated with the one or more content and a logical reading order of the one or more content, wherein the logical reading order which is assigned to each element of the one or more content.

6. The system as claimed in claim 5, wherein the one or more content comprises of: (i) a textual and non-textual elements and corresponding attributes, and properties extracted from a structured format, or (ii) an unstructured format, or (iii) combination thereof.

7. The system as claimed in claim 5, wherein at least one class from the one or more classes corresponds to at least one of: (i) textual class, or (ii) non-textual class, and (iii) a combination thereof.

8. The system as claimed in claim 5, wherein the one or more accessibility attributes corresponds to at least one of: (i) an expansion text for a first occurrence of one or more abbreviations, (ii) at least one meaningful summary for images associated with graphs and charts, (iii) one or more mathematical expressions identified in LaTeX format are converted into a mathematical markup language (MathML) format, (iv) language for one or more paragraphs, (v) replacement text for one or more links, or (vi) column span and row span attributes to complex table data.

9. One or more non-transitory machine-readable information storage mediums comprising one or more instructions which when executed by one or more hardware processors cause:

receiving, content from one or more sources as an input, wherein the content from the one or more sources corresponds to at least one of:
(i) a ready unstructured document,
(ii) a raw content obtained from a structured database or an unstructured database, or
(iii) a raw content and a design layout obtained from a content management system (CMS) and a combination thereof;

extracting, one or more features associated with the content, wherein the one or more features correspond to one or more appearance attributes, and wherein the one or more appearance attributes are categorized based on one or more classes associated with the content, wherein the one or more appearance attributes corresponds to at least one of: (i) font properties associated with the one or more content, (ii) position values, (iii) text parameters, (iv) margin values, (v) scale attributes, (vi) border attributes, or (vii) background color, wherein the one or more classes corresponds to one or more categories of element, and the one or more categories of element corresponds to: (i) a textual data that includes a link, a list, abbreviations, headings, paragraphs, a header, and a footer, and (ii) a non-textual data that includes table, forms, images, drawings, and graphic, wherein the images are trained on an information model with Visual Geometry Group (VGG) architecture for 30 epochs with data augmentation to recognize charts and graphs;

assigning a logical reading order to the one or more categories of element using one or more tags that are created in a same hierarchy and dumps the information in a JavaScript Object Notation (JSON) file, wherein an accuracy of assigning the logical reading order is improved by updating the logical reading order of one or more categories of elements;

validating the one or more content by performing a check to identify whether the content is one of accessible content or inaccessible content based on the extracted one or more features, wherein the content is validated using an artificial intelligence (AI) based automated accessibility intervention engine;

dynamically remediating inaccessible content based on one or more accessibility attributes to obtain the accessible content; and converting, the accessible content into accessible formats based on the one or more classes associated with the content and a logical reading order of the content, wherein the logical reading order which is assigned to each element of the content.

10. The one or more non-transitory machine-readable information storage mediums as claimed in claim 9, wherein the one or more content comprises at least one of: (i) a textual and non-textual elements and corresponding attributes, and properties extracted from a structured format, or (ii) an unstructured format, or (iii) combination thereof.

11. The one or more non-transitory machine-readable information storage mediums as claimed in claim 9, wherein at least one class from the one or more classes corresponds to at least one of: (i) textual class, or (ii) non-textual class, or (iii) a combination thereof.

12. The one or more non-transitory machine-readable information storage mediums as claimed in claim 9, wherein the one or more accessibility attributes corresponds to at least one of: (i) an expansion text for a first occurrence of one or more abbreviations, (ii) at least one meaningful summary for images associated with graphs and charts, (iii) one or more mathematical expressions identified in LaTeX format are converted into a mathematical markup language (MathML) format, (iv) language for one or more paragraphs, (v) replacement text for one or more links, or (vi) column span and row span attributes to complex table data.

* * * * *